C. C. EVANS.
SUPPLEMENTAL PLATFORM SPRING SUPPORT.
APPLICATION FILED JUNE 20, 1918.

1,289,139.

Patented Dec. 31, 1918.

Inventor:
Cullen C. Evans,
by Hazard & Miller
Att'ys.

UNITED STATES PATENT OFFICE.

CULLEN C. EVANS, OF LOS ANGELES, CALIFORNIA, ASSIGNOR TO MASTER EQUIPMENT COMPANY, OF LOS ANGELES, CALIFORNIA, A CORPORATION OF CALIFORNIA.

SUPPLEMENTAL PLATFORM SPRING-SUPPORT.

1,289,139.   Specification of Letters Patent.   Patented Dec. 31, 1918.

Application filed June 20, 1918. Serial No. 241,036.

*To all whom it may concern:*

Be it known that I, CULLEN C. EVANS, a citizen of the United States, residing at Los Angeles, in the county of Los Angeles and State of California, have invented new and useful Improvements in Supplemental Platform Spring-Supports, of which the following is a specification.

My object is to make a supplemental platform spring support for use in changing a Ford automobile into a truck, and my invention consists in the novel features herein shown, described and claimed.

Figure 1:
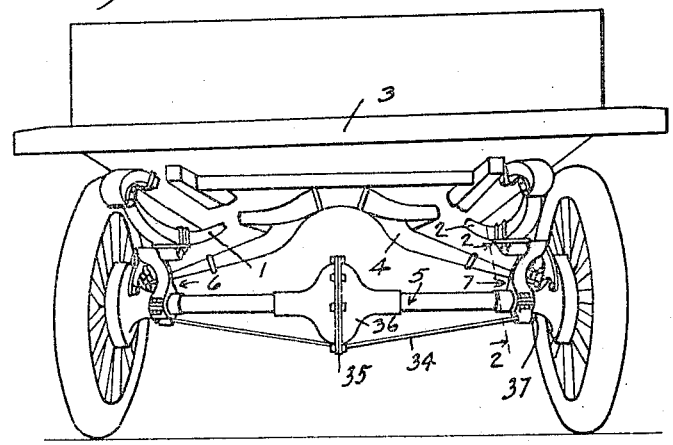
Figure 1 is a rear elevation of a Ford automobile changed into a truck and showing my supplemental platform spring supports in use for supporting the platform or body of the truck.
Figure 2:
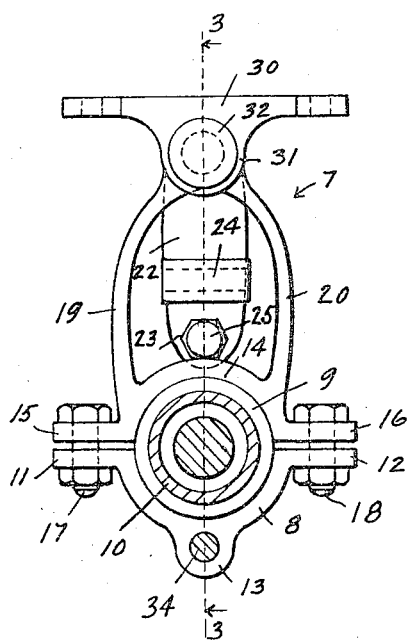
Fig. 2 is an enlarged cross-section on the lines 2—2 of Figs. 1 and 3.
Figure 3:
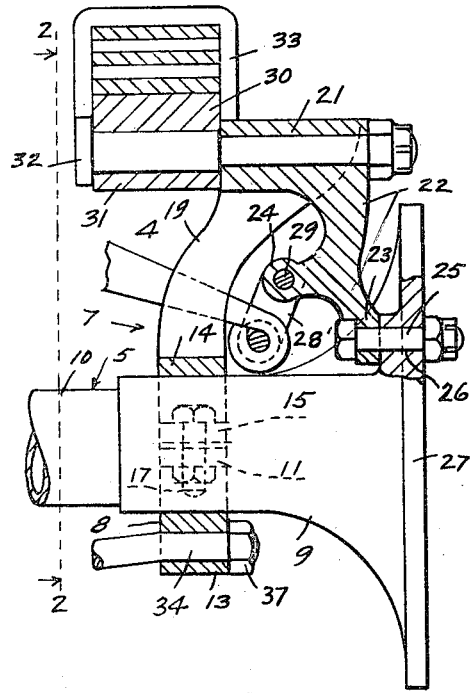
Fig. 3 is a vertical section longitudinal of the axle and on the line 3—3 of Fig. 2.

In changing a Ford automobile into a platform truck I apply supplemental platform springs 1 and 2 to the platform 3 of the truck body, said supplemental springs serving to reinforce the regular springs 4, and the problem is to properly connect the platform springs 1 and 2 to the rear axle housing 5. I remove the rear spring perches supporting the ends of the rear springs 4 and apply my supplemental platform spring supports 6 and 7. These supports are exactly alike and in Figs. 2 and 3 I have shown the details of the support 7.

The lower half bearing 8 is adapted to fit upwardly half way around the sleeve 9 which is upon the end of the tubular axle housing member 10 and has clamping ears 11 and 12 extending from its sides and a truss ear 13 extending downwardly.

The upper half bearing 14 is adapted to fit downwardly around the sleeve 9 and has clamping ears 15 and 16 extending from its sides, there being bolts 17 and 18 connecting the ears 11 and 15, and 12 and 16, respectively, so as to clamp the half bearings 8 and 14 tightly upon the sleeve 9.

Posts 19 and 20 extend upwardly from the upper half bearing 14 and a hinge pin bearing 21 is formed integral with the upper ends of these posts 19 and 20, said bearing 21 being parallel with the axle. An arm 22 extends downwardly from the outer end of the bearing 21 in the plane between the posts 19 and 20. The posts 19 and 20 are off-set outwardly at their upper ends relative to the upper half bearing 14, and the arm 22 extends straight down from the outer end of the bearing 21. A rear spring perch extends downwardly from the arm 22, said perch having a bearing 23 and a bearing 24. A bolt 25 is inserted through the bearing 23 and through the bolt hole 26 in the housing flange 27 from which the original rear spring perch was removed. The links 28 supporting the rear spring 4 are connected to the bearing 24 by placing the upper ends of the links at opposite ends of the bearing and inserting a bolt 29. For this purpose the original links and the original bolt 29 may be used. The plate 30 has a bearing 31 extending downwardly from its center and a bolt 32 is inserted through this bearing 31 and through the bearing 21. The U-bolts 33 are placed straddle of the spring 2 and inserted downwardly through the plate 30 to hold the spring 2 upon the plate. The truss rod 34 extends under the flanges 35 of the differential gear case 36 and one end of the truss rod is inserted through the ear 13 and a nut 37 applied for tightening the truss. The truss rod serves to strengthen the rear axle housing 5 and the addition of the platform springs 1 and 2 reinforces the original rear springs 4, thereby enabling the truck to carry a much heavier load than the original automobile would have carried.

I claim:

1. A supplemental platform spring support comprising the combination with the rear axle housing and housing flange of a Ford automobile, of a lower half bearing adapted to fit upwardly against the axle housing, an upper half bearing adapted to fit downwardly, bolts connecting the bearings together to clamp the axle housing, posts extending upwardly from the sides of the upper half bearing, a hinge pin bearing at the upper ends of the posts and off-set outwardly relative to the half bearings, an arm extending downwardly from the outer end of the hinge pin bearing in a plane between the posts, a bearing extending downwardly from the arm, a bolt inserted through the bearing and through the axle housing flange, a second bearing extending inwardly from the arm; the supporting links of the rear spring being connected to the second bearing by a bolt; and a platform spring pivotally connected to the hinge pin bearing.

2. In a supplemental platform spring support, the combination with the rear axle housing of a Ford automobile, of split bearings clamped upon the ends of the axle housing, ears extending downwardly from the split bearings, a truss rod connecting the ears, posts extending upwardly from the split bearings, hinge pin bearings at the upper ends of the posts, arms extending downwardly from the hinge pin bearings in planes between the posts, bearings extending downwardly from the arms, bolts securing the bearings to the axle housing flanges, second bearings extending inwardly from the arms; the rear spring being connected to the second bearings; and platform springs pivotally connected to the hinge pin bearings.

In testimony whereof I have signed my name to this specification.

CULLEN C. EVANS.